US008749612B1

(12) United States Patent
Ellner et al.

(10) Patent No.: US 8,749,612 B1
(45) Date of Patent: Jun. 10, 2014

(54) REDUCED BANDWIDTH USAGE IN VIDEO CONFERENCING

(75) Inventors: Lars Henrik Ellner, San Francisco, CA (US); Andrew John MacDonald, San Francisco, CA (US)

(73) Assignee: Google Inc., Mountain View ( * ) Notice: Subject to any disclaimer, the term of this patent is extended or adjusted under 35 U.S.C. 154(b) by 227 days.

(21) Appl. No.: 13/309,141

(22) Filed: Dec. 1, 2011

(51) Int. Cl.
*H04N 7/15* (2006.01)

(52) U.S. Cl.
CPC .................................. *H04N 7/15* (2013.01)
USPC ................... 348/14.09; 348/14.08; 348/14.12; 348/14.13

(58) Field of Classification Search
USPC .................... 348/14.01–14.16; 370/260–261; 709/204, 233, 228
See application file for complete search history.

(56) References Cited

U.S. PATENT DOCUMENTS

| | | | |
|---|---|---|---|
| 5,953,050 A | 9/1999 | Kamata et al. | |
| 6,072,522 A | 6/2000 | Ippolito et al. | |
| 6,163,335 A | 12/2000 | Barraclough | |
| 6,453,336 B1 | 9/2002 | Beyda et al. | |
| 6,603,501 B1 | 8/2003 | Parry et al. | |
| 6,621,514 B1 | 9/2003 | Hamilton | |
| 6,757,259 B1 | 6/2004 | Hamilton | |
| 6,775,247 B1 * | 8/2004 | Shaffer et al. ................. | 370/260 |
| 6,941,021 B2 | 9/2005 | Goldstein et al. | |
| 7,007,098 B1 * | 2/2006 | Smyth et al. .................. | 709/233 |
| 7,593,031 B2 | 9/2009 | Root et al. | |
| 7,646,736 B2 | 1/2010 | Yang et al. | |
| 7,716,283 B2 | 5/2010 | Thukral | |
| RE42,288 E | 4/2011 | Degioanni | |
| 2002/0033880 A1 | 3/2002 | Sul et al. | |
| 2002/0118272 A1 | 8/2002 | Bruce-Smith | |
| 2004/0119814 A1 | 6/2004 | Clisham et al. | |
| 2005/0062843 A1 * | 3/2005 | Bowers et al. ............. | 348/14.08 |
| 2006/0023644 A1 | 2/2006 | Jang et al. | |
| 2007/0005804 A1 | 1/2007 | Rideout | |
| 2008/0218582 A1 | 9/2008 | Buckler | |
| 2008/0267282 A1 | 10/2008 | Kalipatnapu et al. | |
| 2008/0316297 A1 | 12/2008 | King et al. | |
| 2009/0079811 A1 | 3/2009 | Brandt | |
| 2010/0271457 A1 | 10/2010 | Thapa | |
| 2011/0018962 A1 | 1/2011 | Lin et al. | |
| 2011/0074910 A1 | 3/2011 | King et al. | |
| 2011/0074913 A1 | 3/2011 | Kulkarni et al. | |
| 2011/0141221 A1 | 6/2011 | Satterlee et al. | |
| 2011/0205332 A1 | 8/2011 | Jeong et al. | |

* cited by examiner

*Primary Examiner* — Melur Ramakrishnaiah
(74) *Attorney, Agent, or Firm* — Young Basile Hanlon & MacFarlane P.C.

(57) ABSTRACT

Video conferencing with reduced bandwidth usage is disclosed. One method comprises receiving an audio stream at a server station connected to a plurality of participants in the video conference, at least one participant being a client station connected to the server station by a network and supplying the audio stream, the server station including a first memory and processor, and the client station including a second memory and processor. A mixing algorithm is performed that determines which video streams of the participants to mix to form a conference video stream for display by at least one of the participants. A video stream from the client station is selectively transmitted to the server station responsive to the mixing algorithm, and the server station transmits the conference video stream and/or the streams to be mixed to the participant(s).

19 Claims, 4 Drawing Sheets

REDUCED BANDWIDTH USAGE IN VIDEO CONFERENCING

TECHNICAL FIELD

The present invention relates in general to video conferencing and more particularly to reducing bandwidth usage during video conferencing.

BACKGROUND

Digital video streams typically represent video using a sequence of frames (i.e. still images). An increasing number of applications today make use of digital video stream encoding for purposes other than traditional moving pictures (such as movies and video clips). For example, video conferencing applications generally format one or more video sources and other digital information for display on a monitor and transmit the formatted data as a digital video stream, irrespective of the specialized nature of the video sources or digital information displayed. Similar video encoding algorithms are often used. However, when sending traditional moving pictures over a network, it generally doesn't matter when the video stream is generated or that it is not real-time. This fact can be taken advantage of by the service provider. The service provider can, for example, pre-encode a whole movie to save central processing unit (CPU) cycles since the same pre-encoded stream can be sent to anyone who wants to see the same movie. In addition, buffering on the client side can occur before playing a movie to compensate for bursty networks and allow for loss-less transport protocols. In video conferencing applications, these things cannot be done due to the real-time nature of video conferencing. In general, even a delay of a couple of seconds degrades the video conferencing experience.

SUMMARY

Herein, embodiments of an apparatus for and method of conducting a video conference with reduced bandwidth usage are taught. One method comprises, by example, receiving an audio stream at a server station connected to a plurality of participants in the video conference, at least one participant being a client station connected to the server station by a network, the server station including a first memory and a first processor configured to execute instructions stored in the first memory, and the client station including a second memory and a second processor configured to execute instructions stored in the second memory. The method also comprises performing a mixing algorithm using at least one of the first processor or the second processor where the mixing algorithm determines which video streams of the participants to mix to form a conference video stream for display by at least one of the participants. Another step in this method is receiving a client video stream from the client station that is selectively transmitted to the server station over the network. The selective transmittal is responsive to the mixing algorithm. Finally, the method includes transmitting at least one of the conference video stream or the video streams of the participants to be mixed to form the conference video stream from the server station to the client station.

One example of an apparatus for conducting a video conference with reduced bandwidth usage taught herein comprises a server station including a first memory and a first processor configured to execute instructions stored in the first memory. The instructions receive an audio stream from a client station connected to the server station by a network, the client station being one of a plurality of participants in the video conference, perform a mixing algorithm that determines which video streams of the participants to mix to form a conference video stream for display by at least one of the participants, receive a client video stream from the client station that is selectively transmitted to the server station over the network responsive to the mixing algorithm, and transmit at least one of the conference video stream or the video streams of the participants to be mixed to form the conference video stream from the server station to the client station.

Another aspect of an apparatus taught herein comprises a client station including a first memory and a first processor configured to execute instructions stored in the first memory to connect to a server station through a network. The server station includes a second memory and a second processor configured to execute instructions stored in the second memory to receive an audio stream from the client station, the client station being one of a plurality of participants in the video conference, perform a mixing algorithm that determines which video streams of the participants to mix to form a conference video stream for display by at least one of the participants, and transmit at least one of the conference video stream or the video streams of the participants to be mixed to form the conference video stream from the server station to the client station. The instructions stored in the first memory also perform the mixing algorithm, selectively transmit a client video stream from the client station to the server station over the network when a result of the mixing algorithm performed by the second processor indicates that the client video stream would be included in the conference video stream responsive to performing the mixing algorithm using the first processor, and displaying the conference video stream.

Variations of these methods and apparatuses and details of other aspects and embodiments are described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

Video conferencing systems typically use video encoding and decoding technology to acquire video stream data from two or more participants over a network, format it into a display that may contain multiple video streams and other data and transmit the formatted display data over a network as a video stream to the clients. This processing is performed at close to real time to provide the video conferencing participants with a simulation of having an in-person meeting that is as realistic as possible. The quality of the transmitted video and the real time performance of the video conferencing system are dependent upon, among other things, available network bandwidth. Where the number of participants exceeds the number of concurrently mixed streams of the conference stream, significant bandwidth is expended sending video streams to the server generating the conference stream that are not needed. Unlike audio streams, where the server generally monitors the unmixed streams to determine their voice activity, the unmixed video streams are not otherwise used.

Taught herein are ways of reducing bandwidth usage such that participants subscribed to the video conference (also called clients herein) do not send their video streams unless required. In an autonomous mode, a client determines whether or not their video stream will be required. A signal mode involves the server signaling to a client when its video stream is required for the mix.

Figure 1:
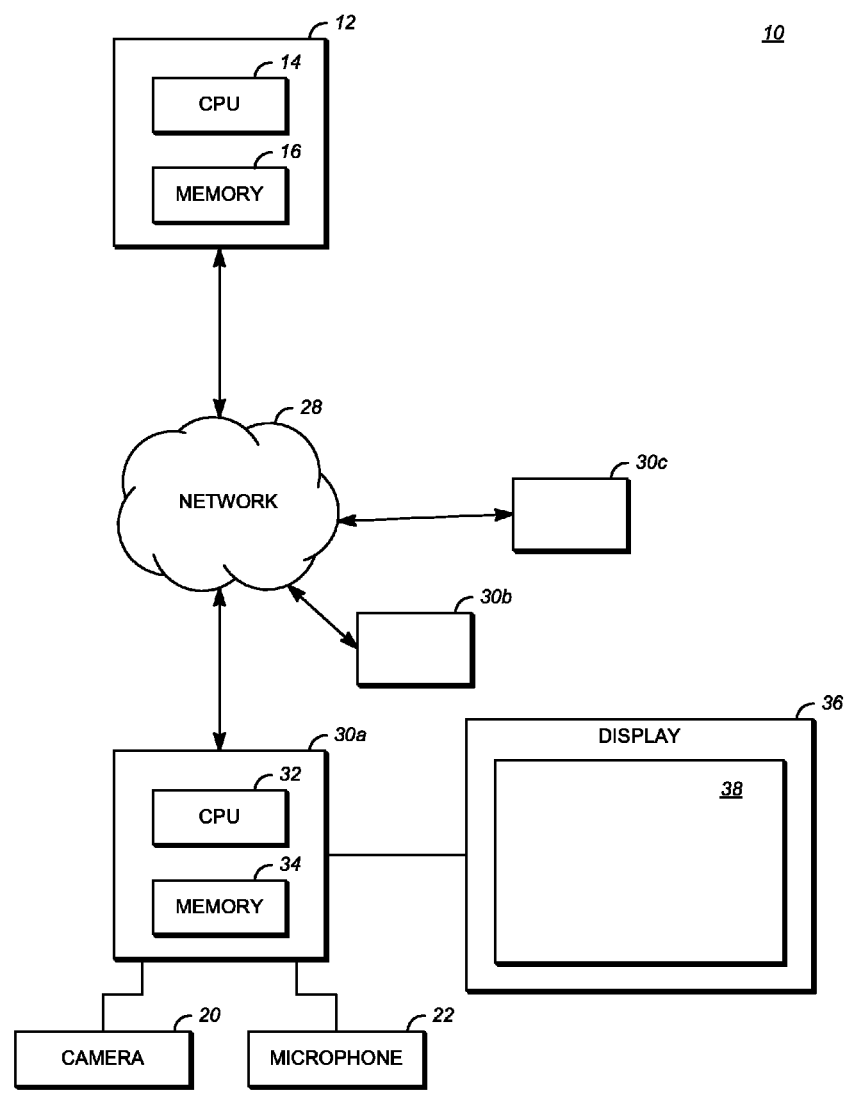
FIG. 1 is a diagram of a video conferencing system in which embodiments of the present invention can be implemented.

FIG. 1 is a diagram of a video conferencing system 10 in which embodiments of the present invention can be implemented. An exemplary server or first station 12 can be, for example, a computer having an internal configuration of hardware including a processor such as a central processing unit (CPU) 14 and a memory 16. CPU 14 can be a controller for controlling the operations of the transmitting station 12. CPU 14 is connected to memory 16 by, for example, a memory bus (not shown). Memory 16 can be read-only memory (ROM), random access memory (RAM) or any other suitable memory device. Memory 16 stores data and program instructions that are used by CPU 14. Other suitable implementations of server 12 are possible. For example, the processing of server 12 can be distributed among multiple devices.

A network 28 connects server 12 and a plurality of clients or second stations 30a, 30b, 30c (collectively, clients 30 hereinafter). Generally, server 12 collects video and voice streams from clients 30 and transmits at least one of the video streams as a conference video stream and at least one of the voice streams as a conference voice stream back to one or more of clients 30. The video streams are generally encoded for transmission over network 28 by whichever station is transmitting a video stream and are decoded upon receipt by whichever station is acting as a receiving station. Network 28 can, for example, be the Internet. Network 28 can also be a local area network (LAN), wide area network (WAN), virtual private network (VPN), cellular phone network and/or any other means of transferring the video stream between server 12 and clients 30. Note that although server 12 is described as collecting video/voice streams from clients 30 and generating the conference video/voice stream for transmission back to one or more of clients 30, server 12 can also act as a relay server rather than a mixer. When server 12 acts as a relay server, the final image and optionally the voice stream is composited by clients 30 based on ingress streams as discussed in additional detail hereinafter.

Client 30a, in one example, can be a computer having an internal configuration of hardware including a processor such as a CPU 32 and a memory 34. Although only the configuration of client 30a is shown, each of clients 30 is generally of the same configuration. CPU 32 can be a controller for controlling the operations of client 30a. CPU 32 is connected to memory 34 by, for example, a memory bus (not shown). Memory 34 can be ROM, RAM or any other suitable memory device. Memory 34 stores data and program instructions that are used by CPU 32. Other suitable implementations of clients 30 are possible. For example, the processing of each client 30a, 30b, 30c can be distributed among multiple devices.

At least some of clients 30 include a camera 20 to capture a video stream to be transmitted to server 12 and a microphone 22 to capture an audio stream to be transmitted to server 12. Camera 20 can be of any type such as an ordinary webcam, a conference room pan-tilt-zoom (PTZ) camera, a high-definition (HD) camera or a personal computer (PC) or laptop built-in camera. Microphone 22 can be any standard microphone.

In FIG. 1, a display 36 configured to display video streams can be connected to client 30a. Clients 30b, 30c generally also include display 36. In some implementations, clients 30 each include display 36. Display 36 can be implemented in various ways, including by a liquid crystal display (LCD) or a cathode-ray tube (CRT) or light emitting diode (LED) display, such as an OLED display. Display 36 is coupled to CPU 32 and can be configured to display a conference video stream 38 decoded at clients 30.

Other implementations of video conferencing system 10 are possible. For example, one or more of clients 30 could itself be a server coupled by network 28 or, more likely, a different network so as to collect and combine video streams for transmission to server 12 and to transmit a conference stream to other stations acting as clients and constructed similarly to clients 30 as described herein. In such an example, the one or more clients 30 acting as a server could omit camera 20 and display 36. In another implementation, additional components can be added to video conferencing system 10. For example, a video camera can be attached to server 12 to capture another video stream to be included in the conference video stream, and a display can optionally be added to server 12 to display a video stream.

In an exemplary implementation described herein, the real-time transport protocol (RTP) is used. Thus, the described embodiment refers to the control protocol (RTCP) for RTP. Another transport protocol can optionally be used instead of RTP. In another implementation, for example, any out-of-band signaling scheme may be used.

Figure 2:
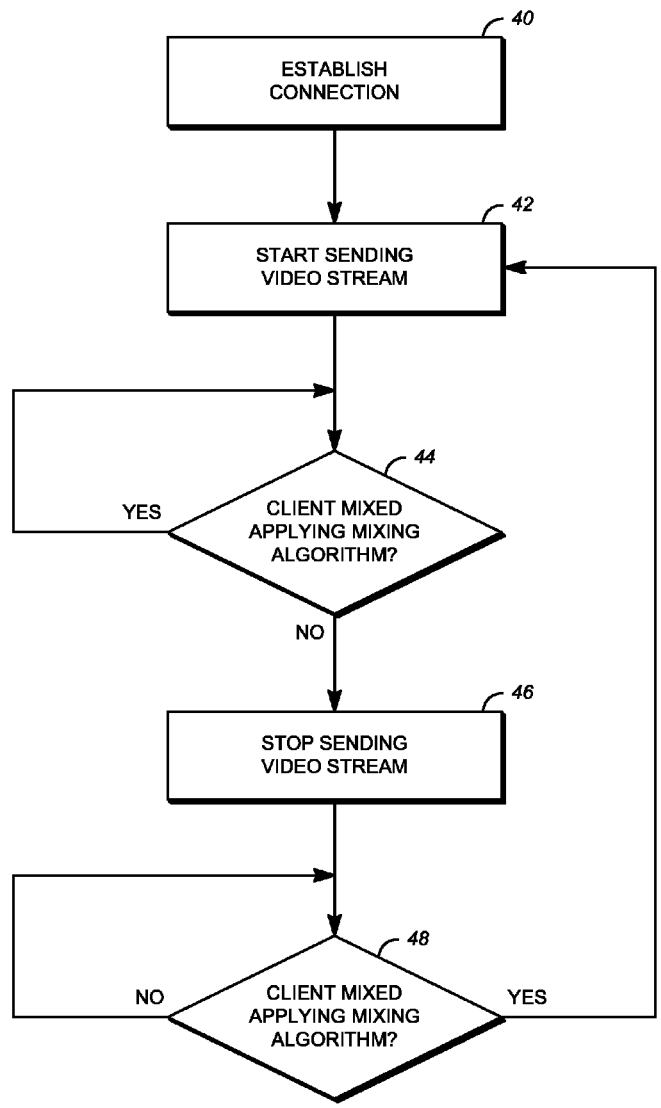
FIG. 2 is a flow chart showing processing of a client according to an embodiment.

FIG. 2 is a flow chart showing processing of a client according to an embodiment. More specifically, a client establishes a connection to the device that will be performing the video mixing and determines whether its video will be required. In this example, client 30a establishes a connection to server 12 in step 40, which performs the video mixing according to a pre-defined mixing algorithm. The pre-defined mixing algorithm can be any known algorithm that selects which video streams from participants to a video conference are used to create a conference video stream to be sent to the participants. For example, several known mixing algorithms base the selection of video streams based on voice activity, either momentary or over a time interval extending into the past. Generally, the voice activity is ranked, and the video streams of those participants with the highest level of activity are used to form the conference video stream.

When the mixing algorithm or scheme is deterministic, client 30a can itself estimate or predict if it may be part of the mix as long as the mixing algorithm is known to client 30a. Herein, this is called autonomous mode. More specifically, once client 30a is connected to server 12 in step 40, client 30a typically begins sending its video stream immediately in step 42, although this is not necessary. Client 30a then applies or performs the mixing algorithm in step 44 to determine whether client 30a would be mixed when server 12 performs the mixing algorithm. Note that this example describes client 30a as having a single audio/video signal. This is not intended to exclude a situation where client 30a transmits images/sounds from a group of participants.

Step 44 is more easily explained by reference to a specific mixing algorithm—in this example, US 2009/0322854 A1, which is assigned to the Assignee of the present invention and is incorporated herein in its entirety by reference. The deterministic methods taught therein base the selection decision on the momentary voice activity of the participants, including client 30a. However, the selection decision observes constraints that improve stability of the image(s) seen by each participant, decrease flickering of the image(s), choose comfortable and helpful swapping times between different image configurations and reflect the importance attributed to sources having a higher accumulated voice activity in a natural conference. One way this is done is by use of, among other variables, a voice activity detection (VAD) that is a stream of binary values representing voice activity from an input audio signal over a number of time intervals. Generally, a current VAD is used to select an input video stream that is used for the outgoing conference stream and to unselect another input video stream so it is not used for the outgoing conference stream unless doing so would violate an imposed constraint. For example, a steadiness constraint prevents a selected input from being unselected and an unselected input from being selected for a certain number of consecutive VADs. An anti-flickering constraint stipulates that the total number of input signals changing status between two consecutive VADs is limited to a predetermined number. A preference constraint is based on an accumulated voice activity, which is a moving average, a recursive relation or a multi-linear function or weighted average of the most recent VADs in an exemplary embodiment.

Accordingly, in step 44 client 30a determines whether it would be mixed according to the mixing algorithm. Of course, certain variables needed to perform the entire algorithm may be unknown to client 30a. For example, client 30a preferably does not receive the VADs for each input signal (i.e., from each participant) in the mixing algorithm described above. As a result, client 30a will use a combination of known parameters (such as those obtained from their own audio signal) and approximate values for unknown parameters.

Values for the unknown parameters are desirably biased so that client 30a sends its video stream if there is any chance that server 12 may decide to use that stream for mixing. For example, where the mixing algorithm above is used, client 30a continues to send its video stream if there is any selection of the unknown parameters for the mixing algorithm (e.g. how long time since the last positive VAD for another participant) that would result in the video stream of client 30a being selected for mixing. That is, network delay is the time for which all state information is unknown so client 30a has to estimate the state for this time frame. The estimate should, in a conservative scenario, be biased towards values that would result in client 30a having to send its own stream. This could be done in one example by estimating the VAD during the time frame to be negative for all other participants.

The number of unknown parameters can be reduced in an embodiment where feedback from server 12 is used. In this example, when RTP is used for transmission, server 12 transmits RTP packets where every packet has an RTP header. Each RTP header contains a (synchronization source) SSRC identifier and may contain a contributing source (CSRC) list. A CRSC list identifies the contributing sources for the payload of a mixed RTP packet by the SSRC identifiers of the streams mixed to form the payload. Each participant to the video conference has a unique SSRC identifier, including client 30a, and by examining the CSRC list, client 30a could obtain feedback. According to one use of feedback, if client 30a will only be mixed in the next mixing cycle if it was mixed previously and client 30a is not mixed according to the CSRC list, client 30a can assume that it will not be mixed. Note that if the CSRC list or other feedback is used, the network delay must be taken into account.

The foregoing generally assumes that in making the decision in step 44, client 30a decides to send its video stream if there is any chance that server 12 may decide to use that video stream for mixing. In some embodiments it may be beneficial to relax this condition, e.g. by applying a heuristic technique, to prevent more participants from sending their video stream when they will not be mixed at the cost of some participants not sending their video stream even though they would have been mixed. If the condition is relaxed in this manner, the mixing algorithm should be extended or additional subsequent decision-making could be added so as to handle not receiving video from a would-be-mixed client. One way of doing this could be to mix only the streams from clients 30 that should be mixed and from which a video stream is received. Another way is by ranking all clients 30 based on the mixing algorithm and picking the top N (where N is the number of participants to mix) from which a video stream is being received for mixing, thus replacing a missing video stream with one that is received. Server 12 could also disregard any clients 30 from which no video stream is received at the time the mixing decision is initially made. This could be done by not considering the audio stream from such clients 30a when performing the mixing algorithm, for example.

Regardless of how client 30a determines whether it would be mixed by the mixing algorithm in step 44, processing advances to step 46 to stop sending the video stream to server 12 if client 30a determines it would not be mixed. Otherwise, client 30a continues to send its video stream and repeat step 44, generally on a periodic basis conforming to the mixing cycle of server 12.

Once client 30a stops sending its video stream in step 46, processing advances to step 48, where client 30a once again determines whether its video stream would be mixed by server 12 applying the mixing algorithm. The same process used to perform the determination in step 44 can also be used in step 48. Alternatively, the same mixing algorithm can be used, but conditions can be applied differently. For example, some values for the unknown parameters can be biased so that client 30a sends its video stream if there is any chance that server 12 may decide to use that stream for mixing when client 30a is already sending a video stream in step 44, but can be biased so that client 30a does not send its video stream unless server 12 will more likely than not decide to use that stream for mixing when client 30a has stopped sending a video stream in step 46.

Regardless of how client 30a determines whether it would be mixed by the mixing algorithm in step 48, processing returns to step 42 to start sending its video stream to server 12 if client 30a determines it would be mixed. Otherwise, client 30a repeats step 48, generally on the periodic basis conforming to the mixing cycle of server 12.

Processing through steps 42-48 of FIG. 2 occurs continuously by client 30a until client 30a disconnects from the video conference.

Note that in this autonomous mode, server 12 runs without modifications to its normal operation. That is, server 12 will perform its mixing algorithm and transmit the mixed conference video stream to clients 30 without providing any additional inputs to clients 30. Server 12 just does not receive streams from some of clients 30 during the video conference. That is, if clients 30 each operate according to the teachings herein, they can selectively discontinue sending their streams to server 12.

Figure 3:
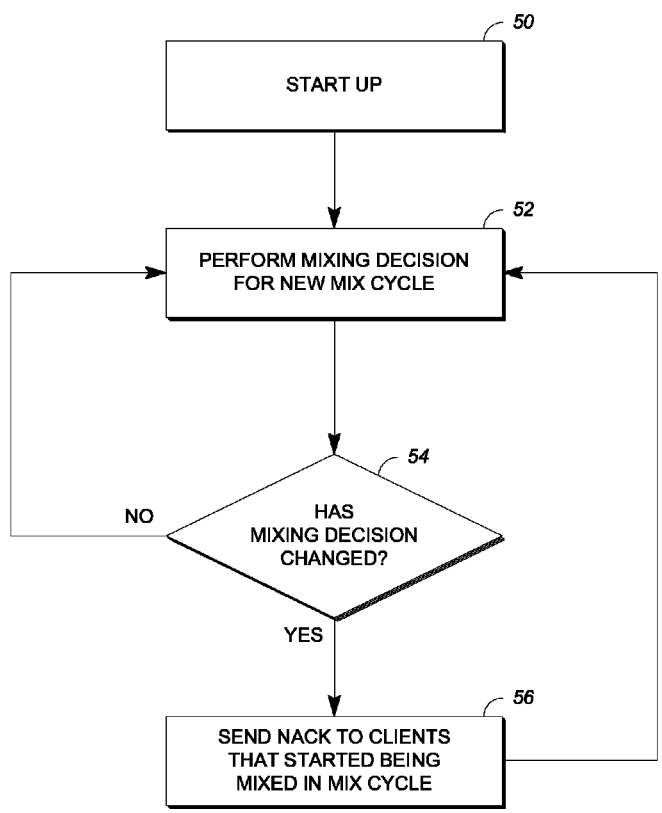
FIG. 3 is a flow chart showing processing of a server according to an embodiment.
Figure 4:
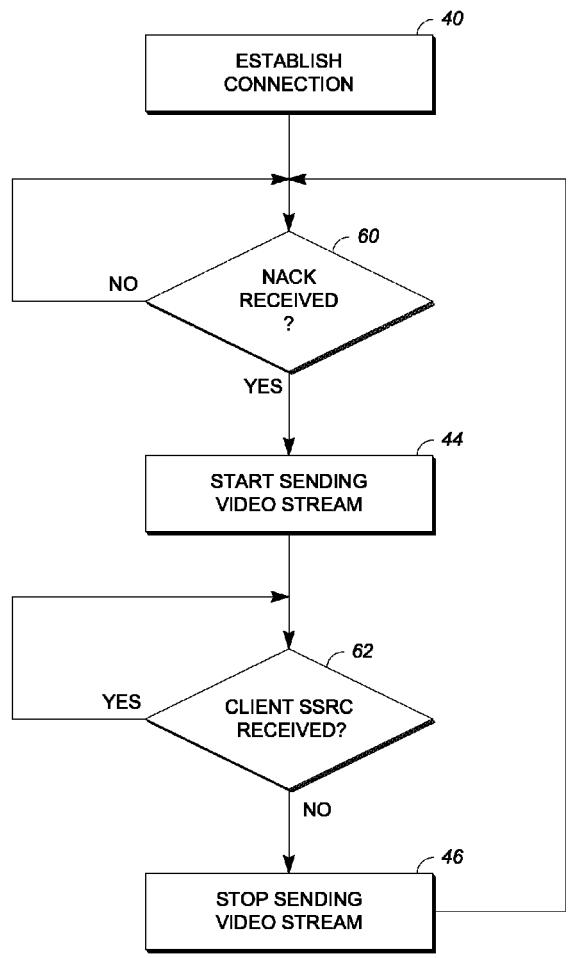
FIG. 4 is a flow chart showing processing of a client according to the embodiment of FIG. 3.

Another embodiment is described with respect to FIGS. 3 and 4. FIG. 3 is a flow chart showing processing of a server according to an embodiment, and FIG. 4 is a flow chart showing processing of a client according to the embodiment of FIG. 3. This embodiment is an example of a signaled mode where server 12 provides additional inputs to clients 30. As mentioned above, RTCP is used for signaling in this example. Note that certain steps in FIG. 4 are repetitive of those in FIG. 2 and are described only briefly below.

As shown in FIG. 3, server 12 starts up the video conference in step 50 by letting clients 30 connect and disconnect at their leisure. When connected, clients 30 transmit audio or voice streams to server 12. Such a stream may include voice data if a participant is using its microphone 22, but it could also include data representing silence if the participant is not speaking or has its microphone 22 muted. Over a plurality of cycles, server 12 performs a mixing algorithm for a new cycle in step 52 to decide which video streams of clients 30 should be mixed in the conference video stream. Generally, the mixing algorithm is performed periodically, but this is not necessary. Instead, performing a new cycle could be based on an event such as the addition or removal of a participant. Another possibility is manual intervention by a conference curator that manages the video conference or by an individual client. The mixing algorithm could be any known mixing algorithm such as those described previously that use voice streams from clients 30.

If the mixing algorithm results in the same decision regarding mixing as the last cycle in response to the query of step 54, processing returns to step 52 to perform the mixing algorithm to make a mixing decision for the next cycle. In contrast, if the mixing decision has changed, i.e., the output of the mixing algorithm indicates that at least one new video stream is to be included in the mixed conference video stream, processing advances from step 54 to step 56. In step 56, server 12 signals each of the clients 30 that were not mixed before but should be mixed in the new cycle. In this exemplary embodiment, this signal is a negative acknowledgement or not acknowledged (NACK) signal. After the first time server 12 sends the signal in step 56, server 12 forms the conference video stream using the selected video stream(s) and returns to step 52 to perform the mixing algorithm for the next cycle. Once server 12 begins transmitting the conference video stream, the processing of steps 52-56 is performed concurrently with that transmission.

As mentioned, clients 30 connect and disconnect to server 12 for the video conference at their leisure. In the example shown in FIG. 4, client 30a establishes such a connection according to known techniques in step 40. In next step 60, client 30a begins monitoring for receipt of the signal from server 12 sent in step 56 of FIG. 4, in this case a NACK signal. Once the signal is received in step 60, processing advances to step 44. In step 44, client 30a starts sending its video stream to server 12 and continues this transmission until its video stream is no longer needed for the mixed conference video stream as indicated by a signal sent by server 12.

More specifically, step 62 checks to see whether the SSRC identifier of client 30a is received. In this particular example, as soon as the CSRC list in the RTP header received from server 12 does not include the SSRC identifier of client 30a in step 62, client 30a stops sending its video stream. Then, processing returns to step 60 to again monitor for the signal from server 12 indicating that the video stream of client 30a is again needed for the mixed conference video stream. Steps 60, 44, 62 and 46 are repeated while client 30a is connected to server 12.

Note that the pace at which video from a client or participant can be mixed, stop being mixed and be mixed again may take a longer time than the network delay. Since changing the mixing configuration too often is perceived as jarring, server 12 should desirably avoid frequent changes by techniques such as those described in US 2009/0322854 A1.

In the description above, the conference video stream is described as being sent from server 12 to clients 30. Note that the conference video stream sent to one client may not necessarily be the same as that sent to another client. As just one example, when client 30a is selected for mixing by the mixing algorithm, the conference video stream sent back to client 30a can omit the video stream from client 30a. That is, server 12 can ensure that the information in the video stream of a client is never sent back to that client. In such a case and assuming that the number of mixed clients in the conference video stream is a constant value N, the CSRC count (that is, the number of SSRC identifiers in the CSRC list received by client 30a) can be used in either embodiment to determine if client 30a is being mixed or not. If client 30a is mixed, the CSRC count will be N−1; otherwise it will be N. In certain embodiments, client 30a could elect to never display a particular participant or may deny some clients permission to view its stream. Typically, these selections are made using an out of band signaling scheme, and the present teachings are not intended to prevent such restrictions.

Further, the conference video stream is described as a mixed stream. This is intended to note that the conference video stream is formed by considering video streams from a number of participants over the course of the video conference. However, at any given time, the conference video stream can consist of only one source video stream. Moreover, the mixing algorithm could result in a conference video stream where only one source is displayed for the entire video conference.

The description of the steps above is only by example. In the above description of FIG. 4, for example, client 30a initially sends its video stream only in response to a signal from server 12. Alternatively, client 30a could start sending its video stream in step 44 immediately upon establishing the connection in step 40. Then, processing would continue as shown. Other variations are also possible.

In the examples of FIGS. 2-4, client 30a represents a single participant producing a single video stream from camera 20 to server 12. Each interaction of FIGS. 2-4 is thus described as a client to a server interaction. In a conference call, there may be many clients, and each client will have its own client-server interaction. In variations of the teachings herein, client 30a could perform mixing where server 12 is a relay server. In this case, the SSRC identifiers of the incoming streams could be used instead of the CSRC list. More specifically, when server 12 is acting as a relay server rather than a mixer, the final image is composited by clients 30 based on ingress streams. When relaying, server 12 decides which streams should be routed to clients 30 based on the mixing algorithm. The egress stream from each client has a unique SSRC, which is negotiated according to RTCP (RFC 3550). Server 12 receives egress streams from clients 30 and decides which of these streams should be sent to which clients 30. For each client there will thusly be a number of ingress streams. The collection of these streams includes the SSRC of the clients that should be mixed, just like the CSRC would if server 12 had done the mixing. In any event, mixing is performed according to known techniques.

Client 30a used by example in FIGS. 2 and 4 is separated from server 12 by network 28. As mentioned previously, however, server 12 can also incorporate a camera 20 and/or microphone 22. As such, server 12 can also separately function as a client/participant in the video conference.

Formation and transmittal of the conference video stream is described above with respect to FIGS. 2-4. Generally, the conference audio stream is separately mixed and is concurrently transmitted from server 12. In these embodiments, any known method of mixing the conference audio stream from the plurality of audio streams received from the participants can be used.

Note that the described embodiments are useful when the number of participants in the video conference exceeds the number of video streams that can be mixed and/or received by the participants. A common arrangement, for example, displays only one video stream source at a time. By incorporating the teachings herein into such a video conference, a first video stream could be sent and used for the conference video stream, while any remaining video streams would not be sent. It is not necessary, however, that the number of participants exceeds the number of video streams that can be mixed and/or received by the participants. Moreover, the number of participants being mixed is not necessarily the same as the capacity of clients 30 and server 12 or the connections therebetween. The number will vary depending on the type of conference in addition to capacity and connections (e.g. mixing many participants results in less space on a display for each individual participant).

The particular format of the digital video streams described herein is not limited. For example, the digital video streams can incorporate formats such as VPx, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10). As such, it is likely that a client will have to send what is conventionally called an I-frame when resuming transmission of its video stream in the steps described previously.

The embodiments of server 12 and clients 30 (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. Further, portions of server 12 and clients 30 do not necessarily have to be implemented in the same manner.

Further, in one embodiment for example, server 12 or each client 30a, 30b, 30c can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

All or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the claims, which scope is to be accorded the broadest interpretation so as to encompass all such modifications and equivalent structure as is permitted under the law.

What is claimed is:

1. A method of conducting a video conference with reduced bandwidth usage, comprising:
   receiving an audio stream at a server station connected to a plurality of participants in the video conference, at least one participant being a client station connected to the server station by a network and supplying the audio stream, the server station including a first memory and a first processor configured to execute instructions stored in the first memory, and the client station including a second memory and a second processor configured to execute instructions stored in the second memory;
   performing a mixing algorithm using each of the first processor and the second processor, the mixing algorithm determining which video streams of the participants to mix to form a conference video stream for display by at least one of the participants;
   selectively transmitting the client video stream from the client station to the server station over the network when a result of the mixing algorithm performed by the second processor indicates that the client video stream would be one of the video streams of the participants to be mixed to form the conference video stream responsive to performing the mixing algorithm using the first processor;
   receiving a client video stream from the client station that is selectively transmitted to the server station over the network responsive to the mixing algorithm; and
   transmitting at least one of the conference video stream or the video streams of the participants to be mixed to form the conference video stream from the server station to the client station.

2. The method of claim 1, further comprising:
   transmitting the client video stream from the client station to the server station upon the client station establishing a connection to the server station; and
   ending transmission of the client video stream from the client station to the server station when the result of the mixing algorithm performed by the second processor indicates that the client video stream would not be one of the video streams of the participants to be mixed to form the conference video stream responsive to performing the mixing algorithm using the first processor.

3. The method of claim 1 further comprising:
   substituting a video stream of another participant for the client video stream to form the conference video stream when the mixing algorithm determines that the client video stream should be used to form the conference video stream and the client station does not transmit the client video stream to the server station.

4. The method of claim 1 wherein the mixing algorithm determines which video streams of the participants to mix to form the conference video stream using a plurality of audio streams received by the server station, each of the plurality of audio streams associated with one of the participants.

5. The method of claim 1, further comprising:
   transmitting a conference audio stream from the server station while transmitting the conference video stream, the conference audio stream formed of at least one of a plurality of audio streams received by the server station and each of the plurality of audio streams associated with one of the participants.

6. The method of claim 1 wherein performing the mixing algorithm includes:
performing the mixing algorithm using only the first processor for a plurality of mix cycles, the method further comprising:
transmitting a signal to each of the participants whose video stream is to be mixed to form the conference video stream in a new cycle based on the mixing algorithm when those participants were not mixed to form the conference video stream in a previous cycle.

7. The method of claim 6, further comprising:
transmitting the client video stream when the client station receives the signal from the server station.

8. The method of claim 7, further comprising:
transmitting a list of the participants whose video streams form the conference video stream in the new cycle with the conference video stream; and
ending transmission of the client video stream from the client station to the server station when the client station is not included in the list.

9. The method of claim 6, further comprising:
transmitting a list of the participants whose video streams form the conference video stream in the new cycle with the at least one of the conference video stream or the video streams of the participants to be mixed to form the conference video stream.

10. An apparatus for conducting a video conference with reduced bandwidth usage, the apparatus comprising:
a client station including a first memory and a first processor configured to execute instructions stored in the first memory to:
perform a mixing algorithm that determines if a client video stream generated at the client station would be included in a conference video stream for display by at least one participant of the video conference; and
selectively transmit the client video stream to a server station to be mixed to form the conference video stream when a result of the mixing algorithm performed by the first processor indicates that the client video stream would be included in the conference video stream.

11. The apparatus of claim 10, further comprising:
the server station including a second memory and a second processor configured to execute instructions stored in the second memory to:
receive an audio stream from the client station, the client station connected to the server station by a network and the client station being one of a plurality of participants in the video conference;
perform the mixing algorithm;
receive the client video stream from the client station that is selectively transmitted to the server station over the network responsive to the mixing algorithm; and
transmit, responsive to performing the mixing algorithm, at least one of the conference video stream or the video streams of the participants to be mixed to form the conference video stream from the server station to the at least one participant.

12. The apparatus of claim 11 wherein the second processor is configured to perform the mixing algorithm by performing the mixing algorithm for a plurality of mix cycles; and wherein the second processor is further configured to:
transmit a signal to each of the participants whose video stream is to be mixed to form the conference video stream in a new cycle based on the mixing algorithm when those participants were not mixed to form the conference video stream in a previous cycle.

13. The apparatus of claim 12 wherein the signal is a NACK signal.

14. The apparatus of claim 12, wherein:
the first processor configured to execute instructions stored in the first memory to:
transmit the client video stream from the client station to the server station when the client station receives the signal from the server station.

15. The apparatus of claim 14 wherein the second processor is further configured to:
transmit a list of the participants whose video streams form the conference video stream in the new cycle with the conference video stream; and wherein the first processor is configured to:
end transmission of the client video stream from the client station to the server station when the client station is not included in the list.

16. The apparatus of claim 15 wherein the list is a CSRC list; and wherein the client station is in the CSRC list when a SSRC of the client station is included in the CSRC.

17. An apparatus for conducting a video conference with reduced bandwidth usage, the apparatus comprising:
a client station including a first memory and a first processor configured to execute instructions stored in the first memory to:
connect to a server station through a network, the server station including a second memory and a second processor configured to execute instructions stored in the second memory to:
receive an audio stream from the client station, the client station being one of a plurality of participants in the video conference;
perform a mixing algorithm that determines which video streams of the participants to mix to form a conference video stream for display by at least one of the participants; and
transmit at least one of the conference video stream or the video streams of the participants to be mixed to form the conference video stream from the server station to the at least one of the participants;
perform the mixing algorithm;
selectively transmit a client video stream from the client station to the server station over the network when a result of the mixing algorithm performed by the second processor indicates that the client video stream would be one of the video streams of the participants to be mixed to form the conference video stream responsive to performing the mixing algorithm using the first processor; and
display the conference video stream.

18. The apparatus of claim 17 wherein the first processor is configured to: receive the video streams of the participants to be mixed to form the conference video stream; and mix the video streams to form the conference video stream.

19. The apparatus of claim 17 wherein the mixing algorithm is deterministic and wherein the first processor is configured to estimate an input into the mixing algorithm associated with at least one participant other than the client station.

* * * * *